Figure 3:
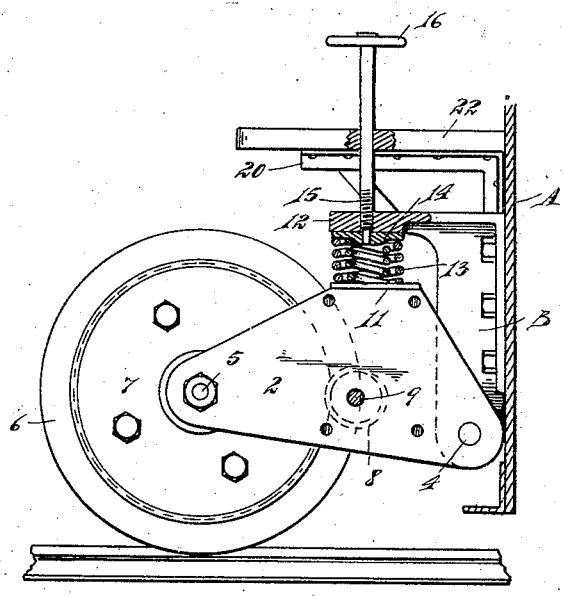

No. 787,693. PATENTED APR. 18, 1905.
J. L. PILLING.
MOTOR FOR TURN TABLES OR SIMILAR STRUCTURES.
APPLICATION FILED AUG. 8, 1904.
2 SHEETS—SHEET 1.
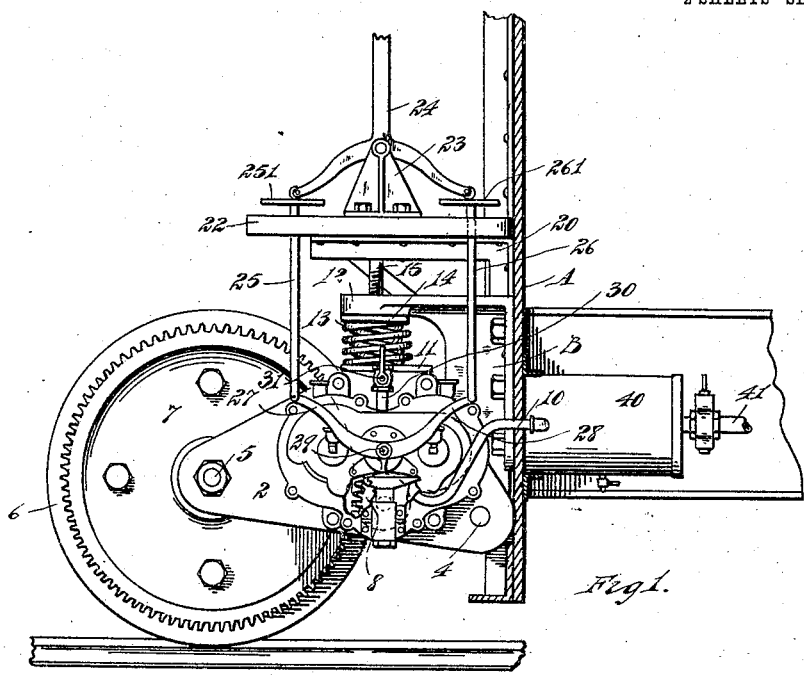
WITNESSES
T. J. Massey
Lotta Lee Hayton
INVENTOR
James L. Pilling
By Parker & Burton
Attorneys.

No. 787,693. PATENTED APR. 18, 1905.
J. L. PILLING.
MOTOR FOR TURN TABLES OR SIMILAR STRUCTURES.
APPLICATION FILED AUG. 8, 1904.

2 SHEETS—SHEET 2.

WITNESSES
INVENTOR
James L. Pilling
By Parker & Burton
Attorneys.

No. 787,693. Patented April 18, 1905.

UNITED STATES PATENT OFFICE.

JAMES LOWE PILLING, OF BUCYRUS, OHIO.

MOTOR FOR TURN-TABLES OR SIMILAR STRUCTURES.

SPECIFICATION forming part of Letters Patent No. 787,693, dated April 18, 1905.

Application filed August 8, 1904. Serial No. 219,872.

*To all whom it may concern:*

Be it known that I, JAMES LOWE PILLING, a citizen of the United States, residing at Bucyrus, county of Crawford, State of Ohio, have invented a certain new and useful Improvement in Motors for Turn-Tables or Similar Structures; and I declare the following to be a full, clear, and exact description of the invention, such as will enable others skilled in the art to which it pertains to make and use the same, reference being had to the accompanying drawings, which form a part of this specification.

This invention relates to motors for turn-tables and similar structures.

It has for its object an attachment adapted to be secured to the body of a turn-table and to be used for the purpose of propelling the turn-table.

The attachment consists, essentially, of a trailing wheel or additional wheel journaled in a bracket which carries an engine geared to the trailing wheel and is provided with suitable appliances for controlling the motion of the engine.

The engine may be run by any suitable motive force, such as steam or compressed air, supplied from any suitable source.

In the drawings, Figure 1 is a side elevation of the attachment, showing also a portion of the turn-table to which the device is attached. Fig. 2 is a rear elevation. Fig. 3 is a side elevation of the trailing wheel and the bracket with the engine removed.

A indicates a part of a turn-table or similar truck.

B indicates a bracket bolted and firmly secured to the turn-table.

2 and 3 indicate arms pivotally secured by a pivot 4 to the bracket B and supporting at their free ends the journal 5 of a trailing wheel 6. On the face of the trailing wheel 6 is bolted a gear-wheel 7, and this meshes with a pinion 8 on a shaft 9, which is the crank-shaft of a double engine whose cylinders are arranged to actuate said shaft. The motive fluid for actuating said shaft is delivered through pipe 10 from any convenient source of power. The arms 2 and 3 support a bearing-plate 11, which is directly under an overhanging part 12 of the bracket B, and interposed between the plate 11 and the overhanging part 12 of the bracket is a cushioning-spring 13 and a plate 14, resting on said cushioning-spring underneath the bracket. A screw 15 is threaded through a screw-hole in the overhanging part 12 of the bracket and bears against the plate 14. The stem of the screw 15 is provided with a hand-wheel 16, by means of which the stem can be run through the threaded hole. By means of the screw the tension or weight with which the truck bears on the trailing wheel is regulated. Above the bracket on other brackets 20 and 21 is a platform 22, to which is bolted a standard 23, and the standard 23 carries journaled in it a switch-lever 24, employed to actuate push-rods 25 and 26, that reach to and themselves actuate arms 27 and 28 of valve 29, which determines the direction of action of the said engines. The exhaust of the engines is through an exhaust pipe 30, closed by a valve 31, which is provided with a handle 32, that reaches through a slot in the platform 22. The handle and valve control the top ends of the rods 25 and 26 and are provided with plates 251 and 261, against which antifriction-rolls on the branches of lever 24 engage, and the engine may be controlled by swinging the lever 24 or by actuating either of said plates 251 and 261 with the foot or otherwise. The platform 22 is of a size to enable an attendant to stand thereon or sit thereon and from the platform control the engine as may be desired.

The engine may be utilized as an effective brake on the wheel by simply closing the valve 31 and regulating the discharge of the exhaust in the exhaust-pipe, and this is arranged to be controlled from the platform by the attendant.

For an engine of this character used for the purpose described the usual motor fluid is air, furnished either from a neighboring compressor or, as is sometimes the case, from the train-pipe and the engine which compresses into the train-pipe, and I utilize a tank 40, which is hung on the turn-table, as a pressure-reducing valve in line between the source of supply, which conducts air to the tank 40 through the pipe 41, and by using the tank 40 I am enabled to overcome the difficulty frequently attendant upon the use of air as a motor fluid and prevent the formation of ice or the freezing of valves at the air-outlet or at the air connection with the engine.

What I claim is—

1. In combination with a bracket adapted to be attached to a truck, a trailing wheel journaled in a support pivotally connected to said bracket, a gear-wheel on said trailing wheel, a pinion meshing with said gear-wheel supported on said bracket, an engine mounted on said support adapted to actuate said pinion, and a bearing between the support and the bracket, substantially as described.

2. A motor for actuating turn-tables, having in combination a bracket adapted to be attached to the turn-table, a trailing wheel, a pivotal connection between the bracket and trailing wheel, a motor carried at a radially-fixed distance from the trailing wheel, means for communicating motion from the motor to the trailing wheel, and means for regulating said motor from the turn-table, substantially as described.

3. As a means for actuating a turn-table, a trailing wheel, a pivotal connection between the trailing wheel and the turn-table, a motor in operative relation with the trailing wheel, a valve in the exhaust of said motor, a reach-rod and foot-plate for actuating said valve from the turn-table, and suitable supports for said reach-rod and foot-plate, substantially as described.

4. As a means for actuating a turn-table, a gear-wheel connected to said turn-table, a motor-driven shaft, a pinion on said shaft meshing with said gear-wheel, a foot-actuated valve controlling said motor, and a reach-rod and foot-plate for actuating said valve, substantially as described.

5. In a mechanism for actuating a turn-table, the combination of a bracket, a trailing wheel, an arm pivoted to the bracket and supported on the journal of said trailing wheel, a motor, a reach-rod and foot-plate for actuating said valve, and suitable supports for said reach-rod and foot-plate carried on said arm, a cushioned pressure-regulating plate interposed between said arm and said truck, and means for regulating the tension on said plate, substantially as described.

6. In a mechanism for actuating a turn-table, the combination of a trailing wheel, connections between the said wheel and the truck, means for rotating said trailing wheel and a pressure-regulating screw between the truck and the wheel, and means for actuating said screw from the truck, substantially as described.

7. In combination with a bracket adapted to be attached to a turn-table, a trailing wheel pivotally connected therewith, a bracket-supported platform, and valve-controlling levers extending above said platform, substantially as described.

8. In a mechanism for actuating a turn-table, in combination with the trailing wheel, an engine arranged to actuate the same, a valve arranged to close the exhaust-passages of said engine, whereby the engine serves as a brake to prevent the wheel from turning, substantially as described.

9. In a mechanism for actuating a turn-table, in combination with a trailing wheel and an engine adapted to actuate said wheel, a storage-tank for motor fluid carried on said turn-table, and located intermediate the engine and a source of supply of said motor fluid, substantially as described.

In testimony whereof I sign this specification in the presence of two witnesses.

JAMES LOWE PILLING

Witnesses:
GEO. W. MILLER,
W. L. MONNETT.